March 23, 1954     E. C. MILLER     2,673,297
ANALYZING AND CONTROL DEVICE
Filed June 13, 1949
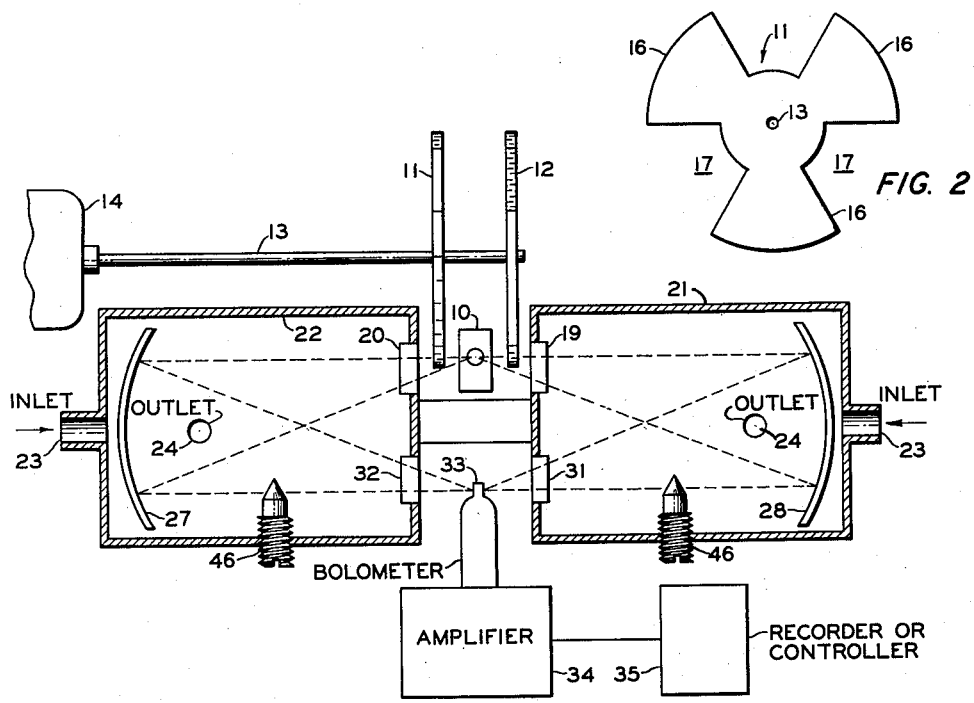
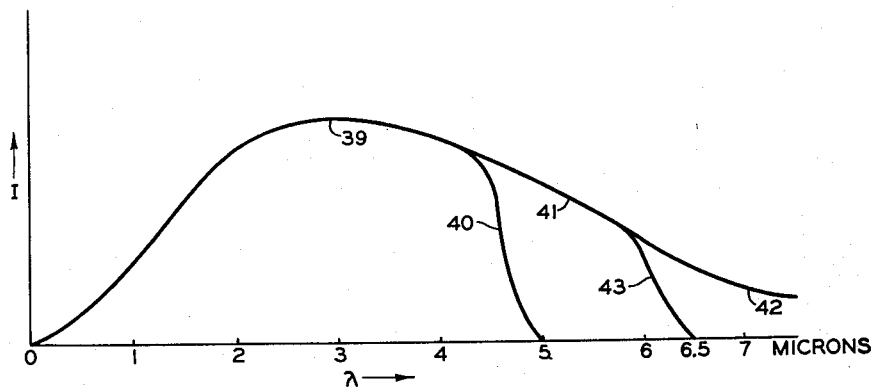
INVENTOR.
E. C. MILLER
BY Hudson & Young
by: L. Malcolm Oberlin
ATTORNEYS Patented Mar. 23, 1954

2,673,297

UNITED STATES PATENT OFFICE 2,673,297

ANALYZING AND CONTROL DEVICE

Elmer C. Miller, Bartlesville, Okla., assignor to Phillips Petroleum Company, a corporation of Delaware Application June 13, 1949, Serial No. 98,728

9 Claims. (Cl. 250—43.5)

This invention relates to a method of and apparatus for analyzing a test sample. In another aspect, the invention relates to a method of and apparatus for analyzing a hydrocarbon stream to determine the proportion of one component in said stream by the use of the infra-red absorption characteristics of the sample.

Heretofore, samples such as hydrocarbon streams have been analyzed by passing one radiation beam through the sample and passing the other radiation beam through a standard fluid. Ordinarily, the beams are of a frequency at which the component of interest in the sample has a principal absorption band, and the amount of radiation absorbed by the sample is a measure of the percentage of the component of interest therein. Accordingly, by electrically comparing the intensity of the beam passing through the standard liquid with the intensity of the beam passing through the sample, the proportion of the component of interest in the sample may be readily determined.

I have found that improved results may be obtained by passing both radiation beams through the sample to be analyzed while filtering one of said beams to remove radiation of a frequency corresponding to the principal absorption frequency of one component of the sample. In this manner, I am able to dispense with the use of the standard fluid while still attaining results of an accuracy comparable with or greater than that of previous methods. In carrying out my method, I have found it advantageous to periodically interrupt both of the radiation beams to produce alternating wave forms of opposite phase. In such a case, when the respective intensities of the beams are compared after passing through the sample, a sample consisting entirely of the component of interest will provide a maximum reading. When a sample is used containing only a portion of the component of interest, a resultant signal is produced which is proportional to the amount of such component in the sample.

It is an object of the invention to provide an improved method of and apparatus for analyzing a test sample.

It is a further object of the invention to provide an improved method of and apparatus for measuring the percentage of a particular component in a hydrocarbon stream.

It is a further object to provide apparatus which is of durable construction, simple in operation, and reliable in performance.

Various other objects, advantages and features of the invention will become apparent from the following detailed description taken in conjunction with the accompanying drawings, in which:

Figure 1 is a schematic diagram illustrating the analyzer of the present invention;

Figure 2 is a view of one of the beam choppers; and

Figure 3 is a graph illustrating a feature of the invention.

Referring now to the drawings in detail, and particularly to Figure 1, I have shown a radiation source 10 which preferably comprises a suitable filament for producing infra-red radiation. In some cases, ultraviolet radiation or even visible light may be utilized to provide the radiation beams. A pair of beam choppers 11, 12 are fixed in spaced relation upon a shaft 13 which is driven by a motor 14. Each of the choppers includes, as illustrated in Figure 2, a plurality of vanes or sectors 16 defining a plurality of gaps or openings as at 17. The choppers 11, 12 are disposed, respectively, on opposite sides of radiation source 10 and they impart an alternating wave form to the radiation beams passing therethrough upon rotation of motor 14, due to the periodic interruption of the beams by the sectors 16. The choppers are so arranged that the sectors 16 of each chopper are opposite the openings 17 of the other chopper so that the alternating wave form of the beams is of opposite phase.

The twin interrupted beams are directed, respectively, through windows 19, 20 formed in cell compartments 21 and 22, each compartment being provided with an inlet 23 and an outlet 24. For purposes of the present invention, the compartments 21, 22 may be regarded as a single cell since the same test sample is fed through both inlets 23 to the respective cell compartments. The beams entering the respective compartments pass through the sample therein and are reflected by concave mirrors 27 and 28, respectively, after which they again pass through the sample in the cell. The mirrors focus the radiation beams upon windows 31 and 32 which are transparent to the radiation, after which both beams are incident upon a radiation-sensitive device 33 which is preferably a bolometer when infra-red radiation is utilized. The device 33 converts each radiation beam into an electrical voltage representative thereof which is amplified by a tuned alternating current unit 34, the output of the amplifier being fed to a recording or controlling device 35. The amplifier 34 is tuned so that its output is proportional to the net amplitude difference between the two sets of signals impressed thereon by the incidence of the radiation beams upon bolometer 33.

In accordance with the invention, the proportion of a particular component or pure substance in the sample is continuously determined by the apparatus of this invention. To this end, window 19 includes a filter which excludes radiation of a frequency corresponding to a principal absorption band of the component of interest in the sample. Window 20 may be transparent, or alternatively, it may be provided with a filter which passes radiation of the frequency corresponding to said principal absorption band. Accordingly, the intensity of the radiation beam passing through window 20 and compartment 22 changes in accordance with variations in the percentage of the component of interest in the test sample whereas the beam passing through window 19 and compartment 21 is not affected by such changes. The amplifier 34 electrically compares the intensity of the two beams and thereby determines the proportion of the component of interest in the test sample. This comparison is facilitated by the use of choppers 11, 12 which produce alternating wave forms of opposite phase in the radiation beams.

In a particular case, the instrument may be used to measure the percentage of butenes in a mixture of butenes and n-butene. The butenes have a principal absorption band at a wave length intermediate 5.0 and 6.5 microns. Accordingly, filter 19 is formed from spinel which is opaque to radiation having a wave length of greater than 5 microns. The filter characteristics are shown by the curves 39, 40 of Figure 3. Window 20 may be formed from transparent material to produce the filter characteristic shown by curve 39, 41, 42, of Figure 3 or, alternatively, a filter is provided which does not pass wave lengths of greater than 6.5 microns, the characteristics of this filter being illustrated by curve 39, 41, 43 of Figure 3. Upon introduction of a sample consisting entirely of butane into both compartments of the test cell, the intensity of both radiation beams is adjusted to be substantially equal by adjustment of screws or trimmers 46, which block out a portion of the light reaching bolometer 33, so that the radiation reaching the bolometer from windows 31, 32 is of opposite phase but equal intensity. Comparison of the resulting voltages by the amplifier 34 produces, of course, a zero reading. When a sample containing butenes is introduced, the intensity of the beam passing through compartment 22 is reduced due to absorption of radiation in the 5.0 to 6.5 micron band by the butenes. However, the intensity of the radiation beam passing through cell 21 is substantially unaffected since said beam contains no components having a principal absorption band in the 5.0 to 6.5 micron region. Thus, the deviation between the two voltages, as measured by amplifier 34, is an accurate measure of the butene percentage in the test sample.

It will be apparent that the method and apparatus for my invention are applicable to the use of other types of radiation, such as ultraviolet or visible light, and that samples other than hydrocarbon streams may be readily analyzed by following the principles of the present invention.

While the invention has been described in connection with a present, preferred embodiment thereof, it is to be understood that this description is illustrative only and is not intended to limit the invention, the scope of which is defined by the appended claims.

I claim:

1. The method of analyzing a sample by use of its radiation absorption characteristics which comprises establishing twin beams of radiation, periodically interrupting one of said beams to produce an alternating wave form, periodically interrupting the other beam to produce an alternating wave form of opposite phase, filtering one of said beams to exclude radiations of frequencies corresponding to a principal absorption band of one component of the test sample, filtering the other beam to permit passage of such radiation frequencies, passing both of said beams through the sample to be tested and comparing the intensity of said beams after they have passed through the test sample to determine the proportion of said component in the test sample.

2. The method of analyzing a hydrocarbon stream by use of its infra-red absorption characteristics which comprises establishing a twin beam of infra-red radiation, periodically alternately interrupting both of said beams to provide alternating wave forms of phase opposite one another, filtering one of said beams to remove radiation of a frequency corresponding to the principal absorption band of one component of the test stream, filtering the other beam to permit passage of radiation of said corresponding frequency, passing both of said beams through a sample of hydrocarbon stream to be analyzed, and electrically comparing the intensity of said beams to determine the proportion of said component in the hydrocarbon stream.

3. The method of analyzing a hydrocarbon stream by use of its infra-red absorption characteristics which comprises establishing twin beams of infra-red radiation, periodically interrupting one of said beams to produce radiation having an alternating wave form, periodically interrupting the other of said beams to produce radiation having an alternating wave form of opposite phase, filtering one of said beams to remove radiation of frequencies corresponding to the principal absorption band of one component of the test stream, filtering the other beam to permit passage of said frequencies, passing both of said beams through a sample of hydrocarbon stream to be analyzed, and electrically comparing the intensity of said beams to determine the proportion of said component in the hydrocarbon stream.

4. Apparatus for measuring the percentage of one component of a test stream comprising, in combination, a source of radiation, a sample cell, first and second windows for passing twin beams of radiation into said cell, one of said windows including a filter for excluding radiation having a frequency corresponding to a principal absorption band of one component of the test sample, said second window permitting passage of said frequency band, a rotatable disk disposed in each beam of radiation, said disks comprising alternate sectors and gaps, the sectors and gaps of said disks being aligned such that said twin beams are alternately interrupted, a pair of windows for permitting said beams of radiation to leave the sample cell, a radiation-sensitive device upon which the twin beams leaving the sample cell are incident, and a recording device actuated by said radiation-sensitive device, said recording device including an alternating current amplifier.

5. Apparatus for measuring the percentage of one component of a test stream comprising, in combination, a source of infra-red radiation, a shaft, a motor for rotating said shaft, a pair of spaced chopping devices mounted on said shaft and disposed on opposite sides of said radiation source, each chopping device comprising alternate sectors and gaps, the sectors of one chopping device being aligned with the gaps of the other chopping device, a cell for receiving a hydrocarbon sample, a pair of windows in said cell disposed in the path of the respective radiation beams passing through said chopping devices, one of said windows including a filter for excluding radiations having a frequency corresponding to a principal absorption band of one component of the hydrocarbon sample, the other window permitting the passage of such radiation, a pair of windows in the sample cell for permitting said beams of radiation to leave the cell, a thermistor sensitive to infra-red radiation, the radiation beams leaving the cell through said windows being incident upon said thermistor, an alternating current amplifier fed by the electrical output of said thermistor, and a recording device actuated by the output of said amplifier.

6. Apparatus for analyzing a process stream comprising, in combination, a source of radiation, a radiation detecting element, a sample cell, means for directing two beams of radiation from said source through said sample cell to said detecting element, filter means disposed in one of said beams to absorb radiation of frequencies corresponding to a principal absorption band of one component of the process stream being analyzed, and means periodically alternately interrupting both of said beams.

7. Apparatus for analyzing a hydrocarbon stream comprising, in combination, a source of infra-red radiation, an infra-red radiation detecting element, a sample cell through which the hydrocarbon stream under analysis is directed, means for directing two beams of radiation from said source through said sample cell to said detector element, filter means disposed in one of said radiation beams to absorb radiation of a frequency corresponding to the principal absorption band of one component of the stream under analysis, and means periodically alternately interrupting both of said beams.

8. Analyzing apparatus comprising, in combination, a source of radiation, a radiation detecting element, a sample cell, means for directing two beams of radiation from said source through said sample cell to said detecting element, filter means disposed in one of said beams to absorb radiation of frequencies corresponding to a principal absorption band of one component of the sample under test which is positioned within said sample cell, a first rotatable disk disposed in one of said beams of radiation, a second rotatable disk disposed in the other of said beams of radiation, said disks each being partially opaque and partially transparent to the radiation emitted from said source, and means for rotating said disks in unison such that said two beams of radiation are alternately interrupted by the opaque portions of said disks.

9. The method of analyzing a sample stream which comprises passing two beams of radiation through a sample to be analyzed, periodically alternately interrupting both of said beams to produce alternating wave forms of opposite phase, filtering one of said beams to exclude radiations of frequencies corresponding to a principal absorption band of one component of the sample, and comparing the resulting intensities of said beams.

ELMER C. MILLER.

References Cited in the file of this patent

UNITED STATES PATENTS

| Number | Name | Date |
|---|---|---|
| 2,212,211 | Pfund | Aug. 20, 1940 |
| 2,439,373 | Stearns, Jr. | Apr. 6, 1948 |
| 2,443,427 | Kidder et al. | June 15, 1948 |
| 2,451,572 | Moore | Oct. 19, 1948 |
| 2,555,327 | Elliott | June 5, 1951 |

OTHER REFERENCES

Recording Infra-Red Analyzers for Butadiene and Styrene Plant Streams, by N. Wright et al., Journal of the Optical Society of America, April 1947, pp. 195–202.

An Infra-Red Chopped Radiation Analyzer, by G. Kivenson et al., Journal of the Optical Society of America, December 1948, pp. 1086–1091.

An Optical Acoustic Method of Gas Analysis, by F. I. Callisen, Nature, February 1947, p. 167.